United States Patent [19]

Sprockhoff

[11] 4,418,963
[45] Dec. 6, 1983

[54] CONTROL SYSTEM FOR A VEHICULAR BRAKING SYSTEM INCORPORATING A HYDRODYNAMIC BRAKE AND A FRICTION BRAKE

[75] Inventor: Volker Sprockhoff, Aachen, Fed. Rep. of Germany

[73] Assignee: ITT Industries, Inc., New York, N.Y.

[21] Appl. No.: 278,122

[22] Filed: Jun. 29, 1981

[30] Foreign Application Priority Data

Jul. 22, 1980 [DE] Fed. Rep. of Germany ....... 3027746

[51] Int. Cl.³ .............................................. B60T 8/08
[52] U.S. Cl. ........................................ 303/3; 303/103
[58] Field of Search ...................... 188/181 A, 181 C; 303/3, 20, 103, 105, 106

[56] References Cited

U.S. PATENT DOCUMENTS 4,278,298 7/1981 Sauka et al. ............................. 303/3
4,283,092 8/1981 Sauka et al. ............................. 303/3

Primary Examiner—Duane A. Reger
Attorney, Agent, or Firm—James B. Raden; Marvin M. Chaban

[57] ABSTRACT

A control system for a vehicular braking system incorporating a hydrodynamic brake and a friction brake acting in parallel comprising logic elements to optimize the operation of the friction brake with a minimum amount of friction brake pad wear, the logic elements operating dependent upon brake-actuation duration, vehicle speed and vehicle deceleration.

13 Claims, 1 Drawing Figure

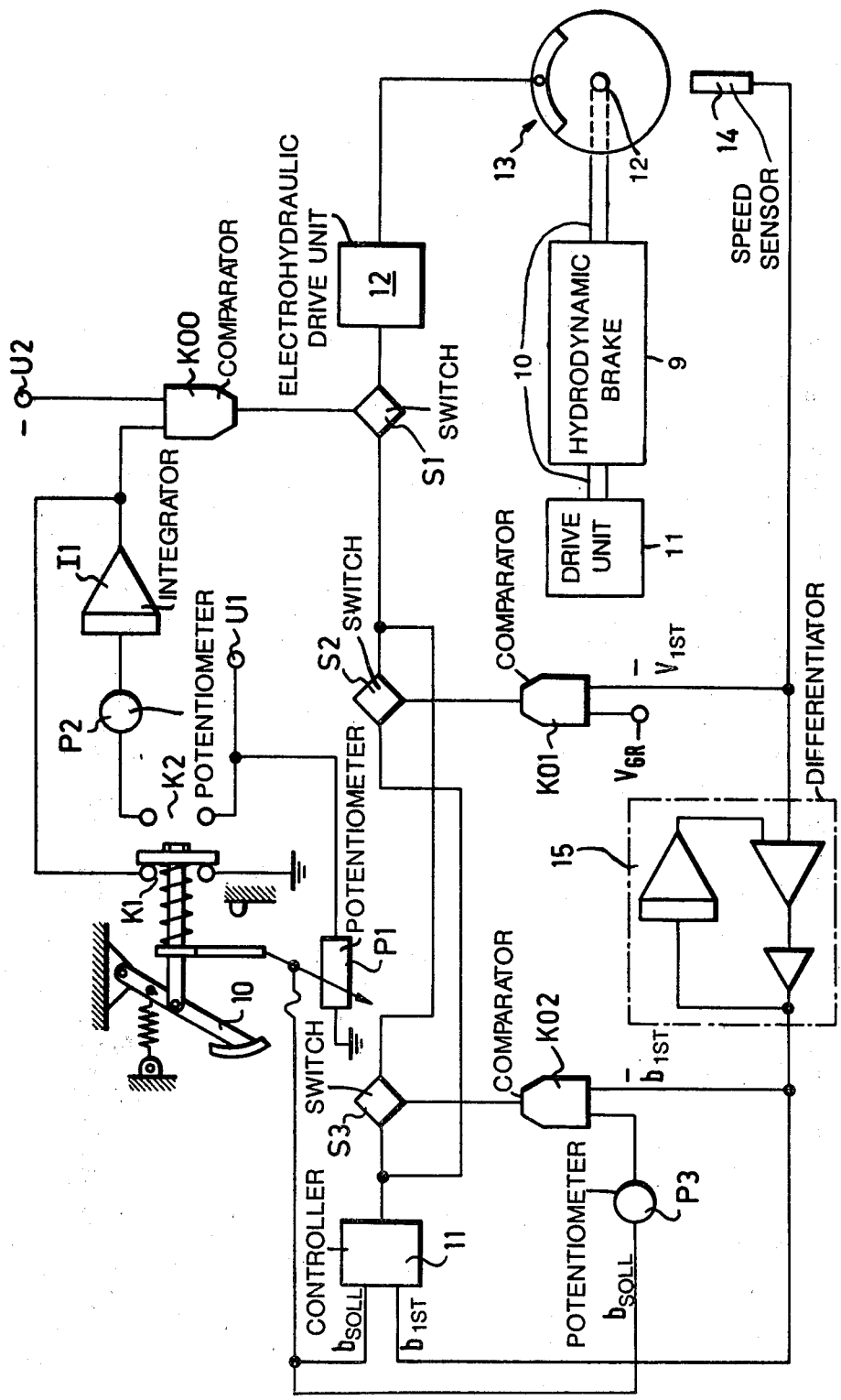

CONTROL SYSTEM FOR A VEHICULAR BRAKING SYSTEM INCORPORATING A HYDRODYNAMIC BRAKE AND A FRICTION BRAKE

BACKGROUND OF THE INVENTION

The present invention relates to a control system for a vehicular braking system incorporating a hydrodynamic brake and a friction brake acting in parallel, wherein the brake pedal force or the brake pedal position is utilized to indicate the required total brake torque and the required total brake torque is generated by the hydrodynamic brake with first priority with the friction brake being controlled such that it generates the difference between the required total brake torque and the brake torque provided by the hydrodynamic brake.

Control systems of this type are known and in practical use. A problem of such control systems is that the friction brake, as a result of physical conditions, responds earlier than the hydrodynamic brake and, accordingly, is subject to a substantial amount of wear. Further, the efficiency of the hydrodynamic brake is substantially ensured in higher speed ranges only whereas the friction brake is fully operable in both higher and lower speed ranges.

In order to ensure an optimum efficiency of control systems including a hydrodynamic brake combined with a friction brake, the requirement is for the friction brake to respond under no circumstances above a specific or threshold vehicle speed from which the hydrodynamic brake possesses the necessary effectiveness, nor shall the friction brake respond at the beginning of a braking action, provided the hydrodynamic brake is in a position to provide the wheel deceleration required for the individual case. If the hydrodynamic brake does not provide, or provides only partially, the wheel deceleration corresponding to the brake pedal force applied, the friction brake is required to supply the missing share. Finally, at speeds below the above-mentioned threshold speed and at which the effectiveness of the hydrodynamic brake decreases as a result of the physical conditions and/or a defect, the friction brake has to compensate for the missing or required deceleration share.

SUMMARY OF THE INVENTION

It is an object of the present invention to provide a control system of the type referred to hereinabove employing simple and economically realizable means so that the above-stated requirements can be met to thereby ensure the obtainment of a functionally safe control system making optimum use of a hydrodynamic brake and a friction brake with a minimum amount of friction brake pad wear.

A feature of the present invention is the provision of a control system for a vehicular braking system incorporating a hydrodynamic brake and a friction brake acting in parallel comprising: first means responsive to movement of a brake pedal to provide a first signal indicating a total required braking torque, the total required braking torque being generated by the hydrodynamic brake with a first priority; and an electronic closed loop having the friction brake therein, the closed loop controlling the friction brake to generate a braking torque equal to the total required braking torque and a braking torque generated by the hydrodynamic brake, the closed loop including second means coupled to the first means and a third means providing a second signal representing an actual deceleration of a vehicle containing the braking system, the second means being responsive to the first and second signals to produce a third signal to control operation of the friction brake, and three logic switches coupled between the second means and the friction brake, each of the three switches being controlled in response to a different one of brake actuation duration, vehicle speed and vehicle deceleration with that one of the three switches responsive to the brake actuating duration being connected to the friction brake and for a logical AND operation with each of the other two of the three switches connected to the second means to provide a logical OR operation.

Because the action of the friction brake is controlled dependent on various operating parameters, optimum use of this friction brake is accomplished with a minimum possible amount of pad wear, a particular advantage being that the entire system can be composed solely of digital elements affording particular economy of manufacture.

BRIEF DESCRIPTION OF THE DRAWING

The above-mentioned and other objects and features of the present invention and the manner of obtaining them will become more apparent by reference to the following description taken in conjunction with the drawing, the single FIGURE of which is a block diagram of an electrohydraulic system constructed in accordance with the principles of the present invention for driving and controlling a friction brake.

DESCRIPTION OF THE PREFERRED EMBODIMENT

In the FIGURE, a hydrodynamic brake 9 is connected to a drive shaft 10 for braking thereof. Drive unit 11 drives drive shaft 10 which through a universal joint and differential (not shown) drives an axle 12, such as a rear axle, to which a wheel brake disc of friction brake 13 is connected. Friction brake 13 is arranged in a closed-loop, wherein a controller 11 receives, on the one hand, the desired wheel deceleration value $b_{SOLL}$ via a mechanical-electrical converter, in particular, a potentiometer P1 connected to brake pedal 10, while, on the other hand, controller 11 receives the instantaneous wheel deceleration value $b_{IST}$ via a rotational speed sensor 14 and a differentiator 15. The two electrical quantities $b_{SOLL}$ and $b_{IST}$ are compared in controller 11, with the resultant or error signal being delivered, via switches S3, S2 and S1, to an electrohydraulic drive unit 12 where the error signal is converted into a corresponding fluid flow leading to the wheel cylinders. The pistons of these wheel cylinders urge the friction pads into engagement with the disc to decelerate the wheels. If the actual wheel deceleration $b_{IST}$ corresponds to the desired deceleration $b_{SOLL}$, no resultant signal, i.e., no error signal, will occur at controller 11, and the status of deceleration will be maintained.

However, this described sequence of operations is allowed to occur only with switches S3 or S2 and S1 in a closed position. Since friction brake 13 is to act only under specific conditions—as already explained—the action of friction brake 13 is influenced, via switches S1, S2 and S3, dependent on various operating parameters. These switches are in turn driven by respective comparators K00, K01 and K02 which are required to sense the individual operating states.

Comparator K00 is used to sense the duration of a braking action, this inquiry serving to suppress a premature action of the friction brake.

Secured to brake pedal lever 10 is a rod having a spring-operated, displaceable disc to actuate contacts K1 and K2. With the relative distance between the two contacts sufficiently small, contact K2 will be quickly closed on operation of the brake pedal and will not open until brake pedal 10 has returned to its initial position. This permits a return movement of the brake pedal 10 without the function of the friction brake being impaired.

Therefore, in addition to electrically presetting a desired deceleration value at potentiometer P1, operation of the brake pedal also causes opening or closing of contact K1 or closing or opening of contact K2.

The closed switch position of contact K1 is to ensure that the output of integrator I1 is zero prior to operation of the brake pedal.

The closed switch position of contact K2 enables integrator I1 as a result of which its output will produce a progressively increasing electric voltage. The voltage increase per unit of time is adjustable via the potentiometer P2 (coefficient of integration). This positive voltage is compared with the predetermined negative voltage U2 in comparator K00. Only when the sum of these two input voltages $\int P2\, U1\, dt > |U2|$ is positive at the comparator, will its output have a defined voltage influencing switch S1 (S1=closed). Switch S1 will remain closed until contact K1 is again closed whereby the output voltage of integrator I1 is rendered zero.

This circuitry causes a retarded action of the friction brake at the beginning of braking, which is adjustable via the coefficient of integration (adjustment to the response of the hydrodynamic brake is possible), and ensures in the standby mode an immediate action of the friction brake, also in the event the effect of the hydrodynamic brake decreases.

By means of comparator K01, the speed is sensed, this inquiry serving to isolate or connect controller 11 from or with the electrohydraulic drive unit 12.

The quantity corresponding to a predeterminable threshold speed is predetermined in the form of an electric voltage $V_{GR}$ and applied to an input of comparator K01. $V_{GR}$ should correspond to an actual speed $V_{IST}=30$ km/h, for example.

If the actual speed $V_{IST}$ is below the threshold speed $V_{GR}$, the output at comparator K01 is positive and switch S2 is closed. Only if $|V_{IST}|$ is greater than $|V_{GR}|$ will switch S2 be opened via comparator K01. The signal to the friction brake in interrupted.

By means of comparator K02, the deceleration of a wheel of the rear axle is sensed. The sensed deceleration serves to indicate the instantaneous functioning or operating condition of the hydrodynamic brake. At low speeds or with the hydrodynamic brake defective, the hydrodynamic brake is not in a position to provide the predetermined brake torque and, hence, the desired deceleration, in which cases the friction brake is required to act.

At the beginning of a braking action and with $|b_{IST}|$ being smaller than $|b_{SOLL}|$, comparator K02 will keep switch S3 closed, this switch being open only if the condition $|b_{IST}|$ greater than $|b_{SOLL}|$ is satisfied. In the last-mentioned case, action of the friction brake in addition to the hydrodynamic brake is not desired.

Potentiometer P3 serves to ensure the action of the friction brake in the event of a malfunctioning of the hydrodynamic brake. In this case it is not ensured that $b_{IST}=b_{SOLL}$ for $V_{IST}$ greater than $V_{GR}$, in spite of an operable hydrodynamic brake.

The combined function of the inquiries explained for the individual cases results in the following friction brake operating conditions:

RB=1: Friction brake may act.
RB=0: Friction brake may not act.

The various possible operating states are combined to five cases listed in the table below:

| | | | | | | |
|---|---|---|---|---|---|---|
| 1. | $\int P2 U_1 dt > U_2$ | $\wedge\ V_{GR} >$ | $V_{IST}$ | $V\ b_{SOLL} >$ | $b_{IST} \rightarrow$ | RB = 1 |
| 2. | $\int P2 U_1 dt > U_2$ | $\wedge\ V_{GR} >$ | $V_{IST}$ | $V\ b_{SOLL} <$ | $b_{IST} \rightarrow$ | RB = 1 |
| 3. | $\int P2 U_1 dt > U_2$ | $\wedge\ V_{GR} <$ | $V_{IST}$ | $V\ b_{SOLL} >$ | $b_{IST} \rightarrow$ | RB = 0 |
| 4. | $\int P2 U_1 dt > U_2$ | $\wedge\ V_{GR} <$ | $V_{IST}$ | $V\ b_{SOLL} <$ | $b_{IST} \rightarrow$ | RB = 0 |
| 5. | $\int P2 U_1 dt < U_2$ | $\wedge\ V_{GR><}$ | $V_{IST}$ | $V\ b_{SOLL><}$ | $b_{IST} \rightarrow$ | RB = 0 |

Cases 1 to 4 and case 5 differ in the first place in the inquiry for the brake actuation duration. In cases 1 to 4, the brake pedal has been actuated a longer time than in case 5. Therefore, switch S1 is already closed in cases 1 to 4, whereas it is not in case 5.

Switch S1 is ANDed together with switches S2 and S3. Therefore, for the friction brake to act, switches S1 and S2 or S3 must be closed. Accordingly, it is clear that switches S2 and S3 are connected in a logic OR operation. The various operating cases illustrated may be described as follows:

Case 1: The friction brake acts because the actual speed $V_{IST}$ is lower than the threshold speed $V_{GR}$ and, in addition, the actual deceleration $b_{IST}$ is lower than the desired deceleration $b_{SOLL}$.

Case 2: Because of the logic connection, the friction brake is allowed to act theoretically. However, $b_{IST}$ being greater than $b_{SOLL}$, there exists an error signal with a negative sign which causes disengagement of the brake pads from the disc, i.e., the friction brake will not act.

Case 3: In this case, the actual speed $V_{IST}$ is higher than the predetermined threshold value $V_{GR}$, the predetermined deceleration, however is not reached (due to a defective hydrodynamic brake, for example). Therefore, the friction brake will become active.

Case 4: The two actual values ($b_{IST}$, $V_{IST}$) exceed the desired value ($b_{SOLL}$) and the threshold value ($V_{GR}$), respectively. The signal for the electrohydraulic drive is interrupted.

Case 5: The switch position of S1 is dominant in this case, irrespective of the operating state of the brake system. This status is only reached at the beginning of a braking action, it represents the retarded action of the friction brake.

The examples explained in detail show clearly that the optimization of the cooperation aimed at between friction brake and hydrodynamic brake is clearly accomplished by the measures of the present invention, and this with a minimum amount of effort, which is of particular importance for putting this control system into practice.

While I have described above the principles of my invention in connection with specific apparatus it is to be clearly understood that this description is made only by way of example and not as a limitation to the scope of my invention as set forth in the objects thereof and in the accompanying claims.

I claim:

1. A control system for a vehicular braking system incorporating a hydrodynamic brake and a friction brake acting in parallel comprising:

first means responsive to movement of a brake pedal to provide a first signal indicating a total required braking torque, said total required braking torque being generated by said hydrodynamic brake with a first priority; and an electronic closed loop having said friction brake therein, said closed loop controlling said friction brake to generate a braking torque equal to said total required braking torque and a braking torque generated by said hydrodynamic brake, said closed loop including second means coupled to said first means and a third means providing a second signal representing an actual deceleration of a vehicle containing said braking system, said second means being responsive to said first and second signals to produce a third signal to control operation of said friction brake, and three logic switches coupled between said second means and said friction brake, each of said three switches being controlled in response to a different one of brake actuation duration, vehicle speed and vehicle deceleration with that one of said three switches responsive to said brake actuating duration being connected to said friction brake and for a logical AND operation with each of the other two of said three switches connected to said second means to provide a logical OR operation.

2. A control system according to claim 1, wherein said third means includes a rotational speed sensor associated with at least one wheel being braked by said friction brake, and a differentiator coupled to said speed sensor to provide said second signal.

3. A control system according to claim 2, further including three comparators each coupled to a different one of said three switches, each of said three comparators delivering an output signal to close an associated one of said three switches.

4. A control system according to claim 3, wherein a first of said three comparators to sense said brake actuation duration has a predetermined fixed voltage coupled to one input thereof and an increasing voltage dependent on the duration of actuation of said brake pedal coupled to the other input thereof, said first of said three comparators providing said output signal in the presence of a predetermined ratio between said fixed voltage and said increasing voltage.

5. A control system according to claim 4, further including a potentiometer coupled to said other input to adjust the increase of said increasing voltage.

6. A control system according to claim 4, wherein a second of said three comparators to sense said vehicle speed has a predetermined fixed voltage indicative of a threshold speed coupled to one input thereof and the other input thereof coupled to said speed sensor to receive a voltage proportional to said vehicle speed.

7. A control system according to claim 6, wherein a third of said three comparators to sense said vehicle deceleration has one input coupled to said first means and the other input coupled to said differentiator.

8. A control system according to claim 7, further including a potentiometer coupled to said one input to adjust said first signal.

9. A control system according to claim 3, wherein a first of said three comparators to sense said vehicle speed has a predetermined fixed voltage indicative of a threshold speed coupled to one input therof and the other input thereof coupled to said speed sensor to receive a voltage proportional to said vehicle speed.

10. A control system according to claim 9, wherein a second of said three comparators to sense said vehicle deceleration has one input coupled to said first means and the other input coupled to said differentiator.

11. A control system according to claim 10, further including a potentiometer coupled to said one input to adjust said first signal.

12. A control system according to claim 3, wherein one of said three comparators to sense said vehicle deceleration has one input coupled to said first means and the other input coupled to said differentiator.

13. A control system according to claim 12, further including a potentiometer coupled to said one input to adjust said first signal.

* * * * *